(12) United States Patent
Horn

(10) Patent No.: US 7,610,867 B2
(45) Date of Patent: Nov. 3, 2009

(54) FOLDING ACCESS WALKWAY FOR A PLANTER

(75) Inventor: Rodney Samuel Horn, Woodridge, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/955,894

(22) Filed: Dec. 13, 2007

(65) Prior Publication Data

US 2009/0151610 A1   Jun. 18, 2009

(51) Int. Cl.
A01C 15/00 (2006.01)
(52) U.S. Cl. .............................. 111/200; 111/900
(58) Field of Classification Search ................. 111/200, 111/900
See application file for complete search history.

(56) References Cited

U.S. PATENT DOCUMENTS

| | | | |
|---|---|---|---|
| 2,018,325 A | 10/1935 | Schnell | |
| 3,254,919 A | 6/1966 | Birchmeier | |
| 3,662,653 A | 5/1972 | Carlson et al. | |
| 4,073,345 A | 2/1978 | Miller | |
| 4,373,851 A | 2/1983 | Confoey | |
| 4,529,215 A | 7/1985 | Strand | |
| 4,634,170 A | 1/1987 | Lach | |
| 4,744,548 A | 5/1988 | Hathaway | |
| 5,094,583 A | 3/1992 | Bills, Jr. et al. | |
| 5,358,225 A | 10/1994 | Volpel et al. | |
| 5,483,907 A * | 1/1996 | Gaalswyk | 111/167 |
| 5,826,523 A | 10/1998 | Gregor | |
| 5,878,679 A | 3/1999 | Gregor et al. | |
| 5,947,040 A | 9/1999 | Gregor | |
| 5,996,515 A | 12/1999 | Gregor et al. | |
| 6,148,748 A | 11/2000 | Bardi et al. | |
| 6,149,374 A | 11/2000 | Dershem et al. | |
| 6,581,530 B1 | 6/2003 | Hall et al. | |
| 6,588,351 B1 | 7/2003 | Hall et al. | |
| 6,591,766 B2 | 7/2003 | Williames | |
| 6,595,148 B2 | 7/2003 | Meyer et al. | |
| 6,688,242 B2 | 2/2004 | Meyer et al. | |
| 6,935,254 B2 | 8/2005 | Ostrander et al. | |
| 7,051,663 B2 | 5/2006 | Meyer et al. | |

(Continued)

FOREIGN PATENT DOCUMENTS

JP          05306099 A    11/1993

(Continued)

OTHER PUBLICATIONS

U.S. Appl. No. 11/846,852, Rodney Samuel Horn.

(Continued)

*Primary Examiner*—Christopher J. Novosad
(74) *Attorney, Agent, or Firm*—Rebecca Henkel

(57) ABSTRACT

A towed implement, such as a planter is provided with a folding platform allowing improved access to row units and seed tanks of the planter implement. The platform is movable or foldable to improve access to row units below the platform while providing access to seed tanks. The platform may be provided in addition to a transverse platform, such as for access to seed tanks in planters. The folding platform may be used, along with handrails and a ladder, for accessing the platform for servicing the implement. The folding platform may be collapsed or folded to allow access to the row units that are beneath the platform.

19 Claims, 4 Drawing Sheets

U.S. PATENT DOCUMENTS

| | | |
|---|---|---|
| 2003/0084829 A1 | 5/2003 | Lempriere |
| 2004/0187755 A1 | 9/2004 | Memory |
| 2004/0255774 A1 | 12/2004 | Hill |
| 2005/0263053 A1* | 12/2005 | Schaffert ............ 111/189 |
| 2006/0243179 A1 | 11/2006 | Landphair et al. |
| 2007/0034450 A1* | 2/2007 | Richey ............ 182/77 |

FOREIGN PATENT DOCUMENTS

JP    2004125160 A    4/2004

OTHER PUBLICATIONS

U.S. Appl. No. 11/846,668, Rodney Samuel Horn.
U.S. Appl. No. 11/846,615, Rodney Samuel Horn.

* cited by examiner

FOLDING ACCESS WALKWAY FOR A PLANTER

BACKGROUND

The present invention relates generally to agricultural implements, and more particularly to a planter or similar implement designed to be towed behind a work vehicle, that is equipped with a ladder, a walkway, and a platform permitting a worker to service the implement.

A wide range of agricultural implements are known and are presently in use, particularly designed for towing behind a work vehicle, such as a tractor. In one family of such implements, including tillers, planters, and so forth, a wide swath of ground can be tilled, planted, or otherwise worked in each pass of the implement in a tilled or untilled field. Planters, for example, often include frames supported by a series of wheels and a tool bar extending transversely with respect to a line of movement of the implement across the field. Attached to the tool bar are a series of row units for dispensing seeds in parallel rows either in tilled or untilled soil. Seed tanks are typically supported on the implement support structure, such as just forward of or over the tool bar. Large amounts of seed may be poured into these tanks and, as the implement is advanced across the field, seeds are transferred from the tanks to the row units by the distribution system. Hoppers located on the row units may contain additional chemicals or materials that are to be dispensed by the row units as well.

Difficulties may arise in servicing such implements owing to the need to access both the row units as well as upper portions of the equipment, in particular, row unit hoppers as well as seed tanks. Both before and after hauling the implement to and from the field, and while the implement is in a field, operator access to the seed tanks may be needed, such as for filling, inspection, removal of debris, and so forth. In traditional planter designs, however, the operator may be obliged to climb on the tool bar or implement support structure to access the seed tanks and any other upper-level elements of the implement. In other designs, a platform may be provided to allow access to the seed tanks. This platform may reduce access to the hoppers and row units underneath the platform and in some instances render the hopper inaccessible when the implement frame has been lowered. While this, in certain situations, may not pose particular problems, it is inconvenient and renders many operations difficult, such as accessing the hoppers to fill them with expensive chemicals or maintenance of the units.

There is a need, therefore, for improved arrangements in towed implements that permit operators to more easily access both the row units as well as upper levels of the implements, in particular, row unit hoppers as well as seed tanks. There is a particular need for arrangements that permit an operator move securely on such levels to access the seed tanks while being able to access the hoppers and row units beneath this level for service and filling.

BRIEF DESCRIPTION

The invention provides an innovative configuration which allows for improved access to row units and seed tanks of an agricultural implement by virtue of the platform design. The platform serves as a walkway, providing access to seed tanks of a planter implement. In an exemplary embodiment, the platform is behind the seed tanks and above the planter row units. The platform pivots, folding up to allow access to the row units for servicing the equipment disposed along the planter tool bar. For example, access to the row units is improved by virtue of the folding platform when accessibility is limited by lowering the planter frame, thereby decreasing the distance between the row units and the platform. Other embodiments may include one or multiple panels that pivot or collapse in various locations on the platform, enabling access to the row units.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
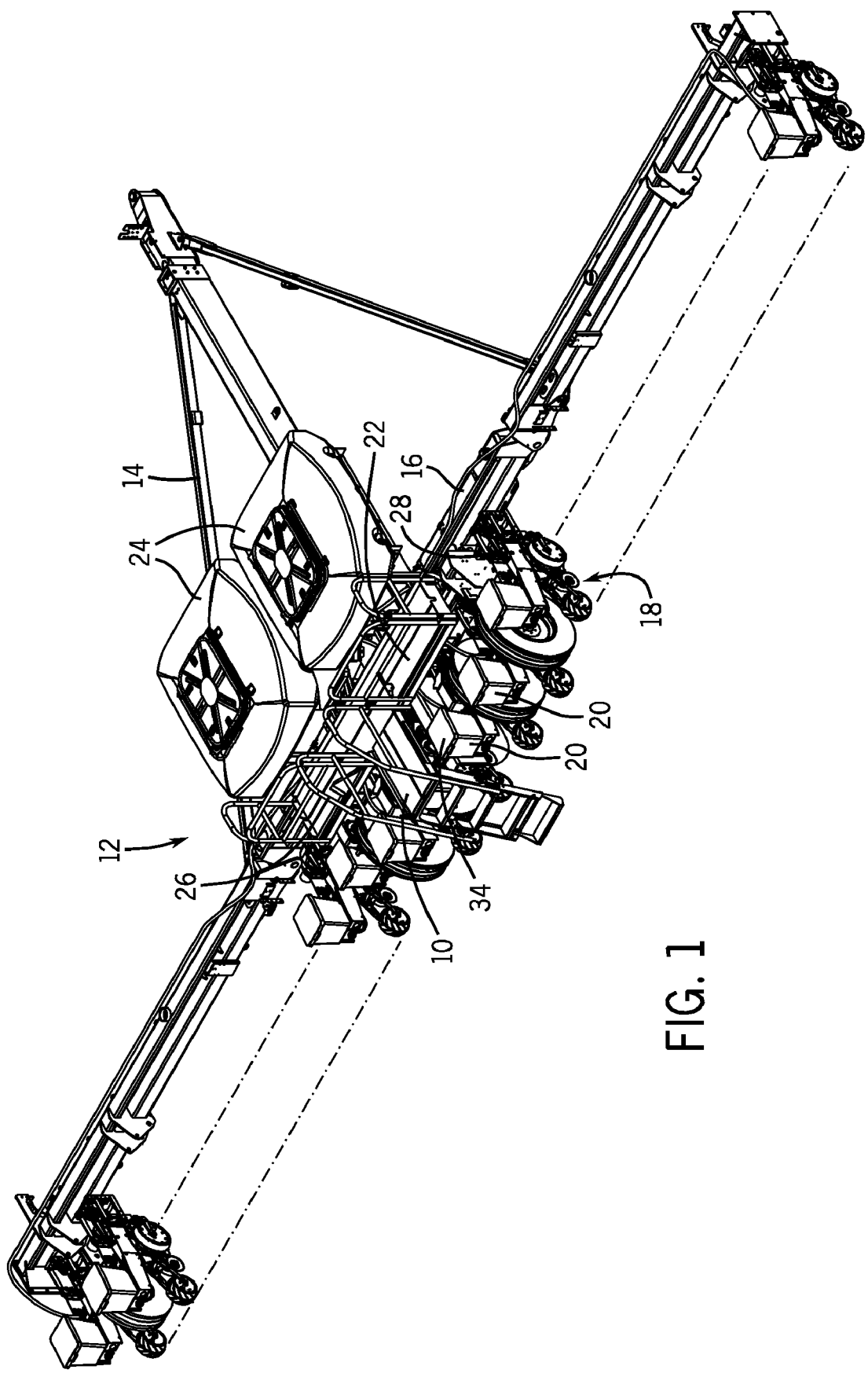
FIG. 1 is a rear perspective view of a planter in accordance with aspects of the invention, including a fixed platform, a folding walkway, and a ladder for accessing upper components of the planter, particularly seed tanks, while also permitting access to the row units and hoppers beneath the folding walkway.

Turning now to the drawings, and referring first to FIG. 1, foldable walkway 10 is shown on an implement 12, illustrated generally in the form of a planter. The planter is designed to be towed behind a work vehicle, such as tractor (not shown). The implement 12 consists of a frame, designated generally by reference numeral 14 that may be made of any suitable material, such as structural steel. A tow bar of the frame forms a fore-end-aft longitudinal beam designed to be connected to the towing work vehicle.

The frame 14 further includes a tool bar 16 secured generally transverse to the tow bar, on which row units 18 are mounted. As will be appreciated by those skilled in the art, the row units may serve various functions, depending upon the design, the nature of the field to be planted (e.g., tilled or untilled), the particular seeds to be planted, and so forth. Structures of each row unit may typically include and opener disc, a metering system, a covering disc, a firming wheel, and so forth. Accommodations may be made for fertilizers, dispensing of fertilizers or chemicals, and the like. The row units are spaced apart along the tool bar to provide the desired spacing of rows of crops after seeding. Transport wheels (partially visible in the figures) will typically be provided in a center section of the implement to allow the row units to be raised out of contact with road surfaces for transport of the implement. Moreover, as will be appreciated by those skilled in the art, depending upon the width of the implement, the tool bar may define a central portion and outwardly extending wings that can be folded forwardly and upwardly to reduce the overall width of the implement for road transport. Chemical hoppers 20 may be located on the row units to allow distribution of substances in addition to seeds. A stationary operator platform 22, located fore of the foldable walkway 10 and aft of seed tanks 24. This platform 22 facilitates access, servicing, inspection and so forth of the seed tanks 24. Rails 26 are provided to provide additional stability to the operator when accessing the upper portion of the implement. A distribution system is provided for transferring seeds from seed tanks 24 to each of the row units 18.

In the illustrated embodiment, a pair of seed tanks 24 are mounted on the implement frame, and supported by tank support structures. These support structures will typically include structural steel and truss members, as well as seed tank support platforms on which the tanks are mounted. Each of the tanks will typically include a cover or lid that can be removed for loading of seeds in automated, semi-automated or manual operations. The covers also permit inspection of the seeds, removal of debris, and so forth.

Figure 2:
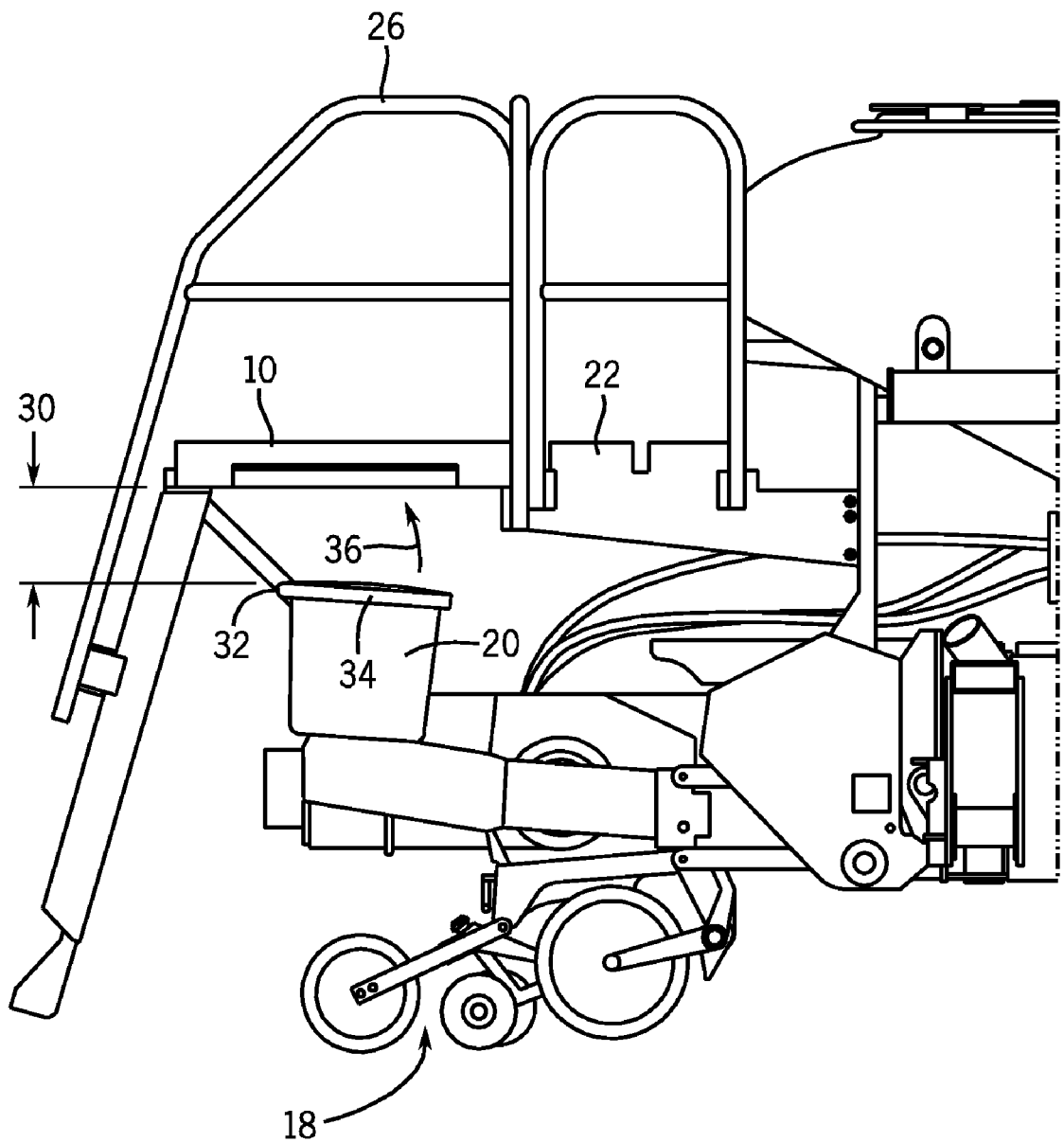
FIG. 2 is a side cross-section view of the rear portion of the implement, showing a row unit, a hopper, the folding walkway, and the distance between the hopper and walkway.

As shown in somewhat greater detail in FIG. 2, the cross-section view of a central portion of the implement shows an opening clearance distance 30 provides clearance between the hopper 20 and folding walkway 10. As will be generally appreciated by those skilled in the art, clearance distance 30 is variable, i.e. when the planter is deployed in the field, the frame and the platform may be drawn closer to the hopper 20, thereby decreasing the clearance distance 30 significantly. Variations in terrain may also cause variations in clearance distance 30. For example, the clearance distance 30 may be reduced from 9.75 inches to 3.25 inches during deployment. Pivot 32 enables hopper cover 34 to pivot open, generally indicated by arrow 36. In one embodiment, hopper cover 34 may be as large as 18 inches, as measured along the implement's towing direction. In this case, the reduced clearance distance 30, will cause interference with the hopper cover 34, thereby preventing the hopper cover 34 from completely opening without the folding of walkway 10.

Figure 3:
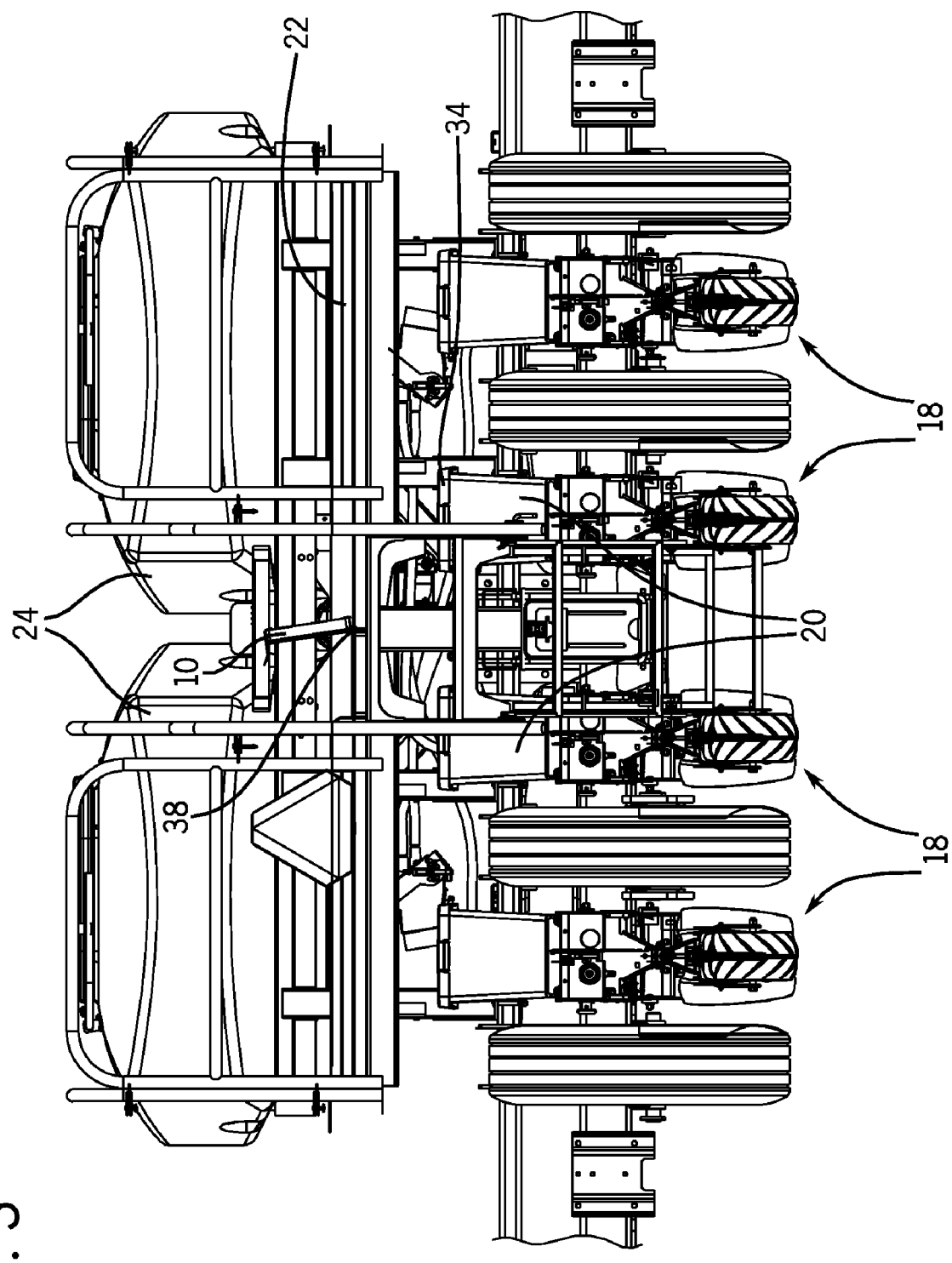
FIG. 3 is a rear view of the same arrangement, showing the platform, hoppers, and a presently contemplated arrangement for the folding walkway, in which view a panel of the walkway is folded up for easily accessing the hopper.

FIG. 3 illustrates a rear view of a central portion of the implement with one side panel of folding walkway 10 folded up. In the embodiment, both sides of folding walkway 10 may be raised along walkway pivot point 38. As shown, the raised panel enables improved access to hopper 20 as well as portions of row units 18.

Walkway 10 and platform 22 may be made of any suitable materials. For example, sheet steel may be employed for the bases or walking surfaces of the platforms, which may be bent to form or provided with flanges to prevent tools and other implements from being inadvertently dropped or kicked from the platforms. The platforms may also be covered with an anti-skid coating or appliqué to improve footing. Expanded metals, textured surfaces, and so forth may also be employed for similar purposes.

Folding walkway 10 may fold in various ways, with a single fold dividing two parallel panels being illustrated in the figures. Where two such panels are provided for the folding platform, these may be joined to one another and to a support structure at pivot points, or by hinges as will be generally appreciated by those skilled in the art. Thus, when unfolded in the service position, the weight of the operator will tend to press the panels downwardly in a stable manner.

Figure 4:
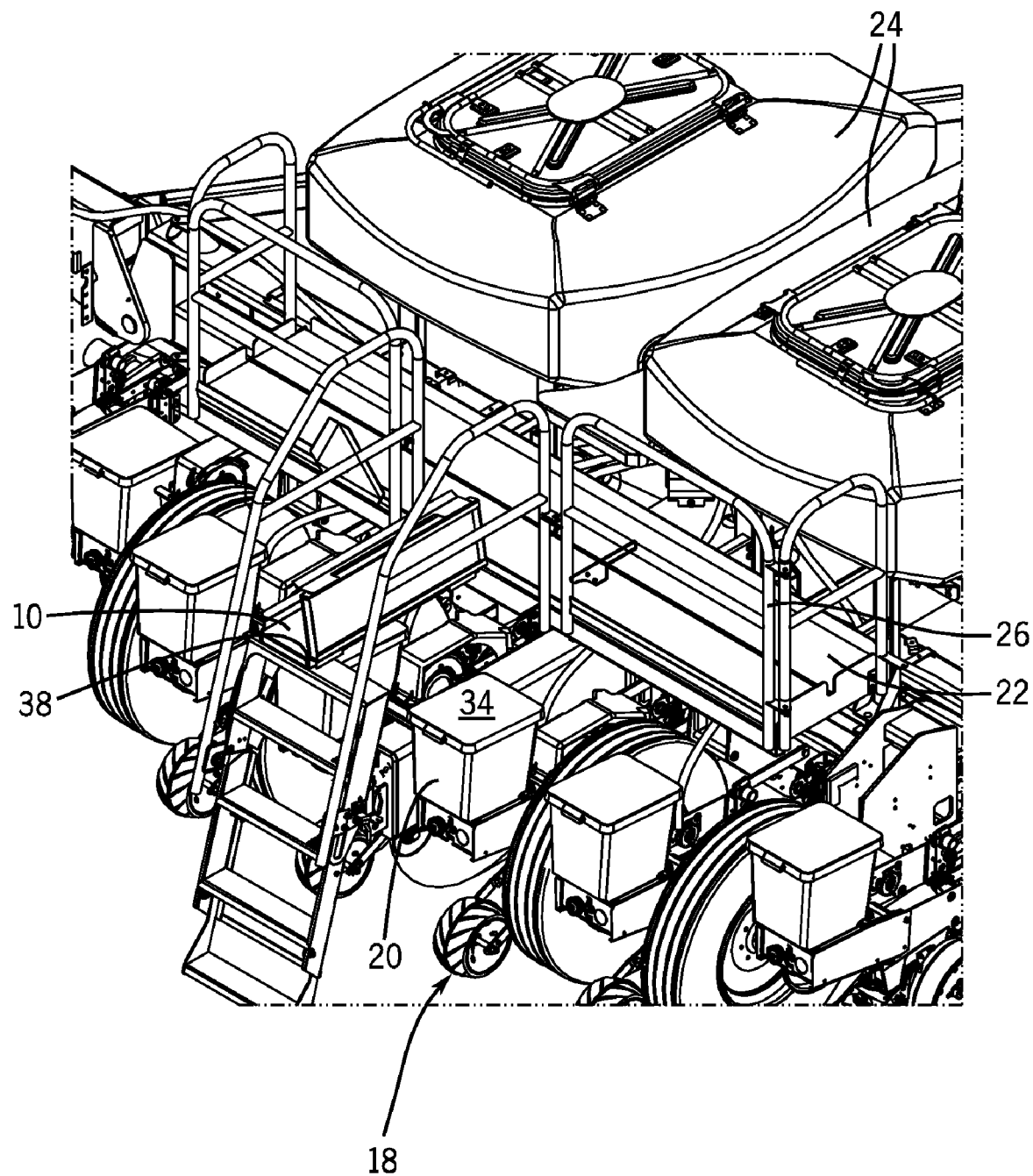
FIG. 4 is a more detailed view of the arrangement of FIG. 1, with a panel of the folding walkway folded to permit access to hoppers below the walkway.

FIG. 4 illustrates a detailed view of the walkway 10 in its raised position. In the illustrated embodiment, two parallel panels define the platform, the panels are folded upwardly along a central fold line, which runs generally in the direction the implement is towed. As will be appreciated by one of ordinary skill in the art, other arrangements may be envisaged, where more than two panels are foldable and several pivot points or fold lines may be used.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A towed agricultural implement comprising:
 a frame including a tool bar extending generally transverse to a central axis along which the implement is towed in operation;
 at least one row unit coupled to the tool bar;
 at least one hopper disposed generally on the row unit; and
 a walkway extending generally longitudinally to said central axis and supported on the frame and disposed generally above the at least one row unit and the at least one hopper, wherein the walkway pivots to provide access to the hopper.

2. The implement of claim 1, wherein the walkway includes a pair of folding panels.

3. The implement of claim 2, wherein the panels fold along a line generally parallel to the central axis.

4. The implement of claim 1, comprising at least one tank supported generally above the tool bar and a fixed operator platform extending generally transverse to the central axis aft of the tank.

5. The implement of claim 4, wherein the walkway is disposed aft of the fixed platform.

6. The implement of claim 1, wherein the walkway pivots to provide access to a meter system disposed generally on the tool bar.

7. The implement of claim 1, wherein a clearance distance between the walkway and the hopper is variable by lowering of the frame or raising of the row unit.

8. The implement of claim 1, comprising a pair of stationary rails disposed on lateral sides of the walkway.

9. The implement of claim 1, wherein the hopper is a granular chemical hopper.

10. A towed agricultural implement comprising:
 a frame including a tool bar extending generally transverse to a central axis along which the implement is towed in operation;
 a plurality of row units coupled to the tool bar, wherein the row units may contact a ground surface;
 a plurality of hoppers disposed generally on the row units;
 an actuation system for lowering the frame with respect to the row units; and
 a folding walkway extending generally longitudinally to said central axis and supported on the frame and disposed generally fore-and-aft above the hoppers, wherein the folding walkway pivots to provide access to the hoppers when the frame is in a lowered position.

11. The implement of claim 10, wherein the folding walkway includes a pair of folding panels.

12. The implement of claim 11, wherein the panels fold along a line generally parallel to the central axis.

13. The implement of claim 10, comprising at least one tank supported generally above the tool bar and a fixed operator platform extending generally transverse to the central axis aft of the tank.

14. The implement of claim 10, wherein the walkway pivots to provide access to at least one meter system disposed generally on the tool bar.

15. The implement of claim 10, wherein the folding walkway is disposed above a pair of central row units and associated hoppers.

16. The implement of claim 10, comprising a pair of stationary rails disposed on lateral sides of the walkway.

17. The implement of claim 10, further comprising at least one seed tank supported by the frame, wherein the seed tank is disposed generally above the tool bar.

18. The implement of claim 17, further comprising a seed distribution system for distributing seeds from the tank.

19. A method of manufacturing an agricultural implement, the method comprising:

coupling a plurality of ground contacting row units on a tool bar, the tool bar being disposed on a frame generally transverse to a central axis along which the implement is towed in operation;

disposing a plurality of hoppers generally on the ground contacting row units;

disposing a walkway extending generally longitudinally to said central axis and on the frame generally above the ground contacting row units and the plurality of hoppers, wherein the walkway is configured to pivot to provide access to the hoppers.

* * * * *